United States Patent
Hulden

(10) Patent No.: US 8,517,223 B2
(45) Date of Patent: Aug. 27, 2013

(54) TWO STAGE GREASE GUN

(75) Inventor: Richard M. Hulden, Taylors, SC (US)

(73) Assignee: International Specialties Services, Inc., Travelers Rest, SC (US)

( * ) Notice: Subject to any disclaimer, the term of this patent is extended or adjusted under 35 U.S.C. 154(b) by 721 days.

(21) Appl. No.: 12/387,652

(22) Filed: May 5, 2009

(65) Prior Publication Data

US 2009/0272762 A1     Nov. 5, 2009

Related U.S. Application Data

(60) Provisional application No. 61/126,490, filed on May 5, 2008.

(51) Int. Cl.
*B67D 7/70* (2010.01)

(52) U.S. Cl.
USPC ............... 222/255; 222/1; 222/323; 222/340; 222/389; 222/525; 417/521

(58) Field of Classification Search
USPC ................. 222/256–260, 340, 323, 324, 523, 222/525, 1, 129, 137, 145.1, 255, 318, 386, 222/389; 417/251, 253, 521
See application file for complete search history.

(56) References Cited

U.S. PATENT DOCUMENTS

| | | |
|---|---|---|
| 4,077,494 A | 3/1978 | Spaude et al. |
| 5,277,339 A | 1/1994 | Shew et al. |
| 5,343,982 A | 9/1994 | Min |
| 5,404,967 A * | 4/1995 | Barry ................. 184/105.2 |
| 5,884,818 A | 3/1999 | Campbell |
| 7,249,695 B2 | 7/2007 | Shew |
| 2005/0230430 A1 * | 10/2005 | Linkletter et al. ......... 222/383.1 |

FOREIGN PATENT DOCUMENTS

WO       WO 97/26456       7/1997

* cited by examiner

*Primary Examiner* — Jason Boeckmann
(74) *Attorney, Agent, or Firm* — J. Bennett Mullinax, LLC

(57) ABSTRACT

A two stage grease gun with a handle capable of being actuated by a user is provided. The gun includes a high volume/low pressure piston for delivery of grease at a high volume and low pressure. A high pressure/low volume piston for delivery of grease at a high pressure and low volume is also included. Acutation of the handle by the user causes both pistons to move. A by-pass check valve is present and is configured to actuate based upon a backpressure. The by-pass check valve is not actuated by the user and effects the amount of grease dispensed by way of the high volume/low pressure piston. An associated method is also provided.

2 Claims, 4 Drawing Sheets

TWO STAGE GREASE GUN

RELATED APPLICATIONS

This application claims the benefit of U.S. Provisional Application Ser. No. 61/126,490 filed on May 5, 2008 and which is incorporated by reference herein in its entirety for all purposes.

FIELD OF THE INVENTION

This invention is directed generally towards a two stage grease gun. More particularly, the present application involves a grease gun capable of dispensing grease in a high volume/low pressure manner and automatically shifting to a low volume/high pressure manner when higher pressures are needed because of clogging or other factors.

BACKGROUND OF THE INVENTION

While it is known to provide grease guns which make use of auxiliary pumps or external pneumatic pressure sources to vary the volume and pressure of grease supplied, such devices require the use of expensive motors or sources of external power. Accordingly, they are not usually portable.

It is also known to provide a variable stage grease gun which utilizes a user operated switch or coupling to vary the grease gun from one application to another. Such an arrangement requires the user to appropriately engage and disengage the gun in the appropriate conditions but the user may be unaware of when desired changes to the gun operation are needed. Accordingly, there remains room for improvement and variation within the art with respect to grease guns.

SUMMARY OF THE INVENTION

It is one aspect of at least one of the present embodiments to provide a manually operated grease gun having a first piston and a second piston, the first piston being a high volume/low pressure piston and the second piston being a high pressure/low volume piston, each piston simultaneously engaged by an operatively disposed handle. A check valve is positioned which automatically closes when pressure required to inject grease exceeds a threshold value. In this manner, the pumping action of the user will preferentially actuate the high pressure/low volume piston until such time as a clogged inlet or other obstacle is overcome. Once the pressure of the dispensed grease falls below the threshold value, the check valve again opens and the actuation of the grease gun conveys the higher volume of grease generated by the lower pressure piston.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DETAILED DESCRIPTION OF REPRESENTATIVE EMBODIMENTS

Figure 1:
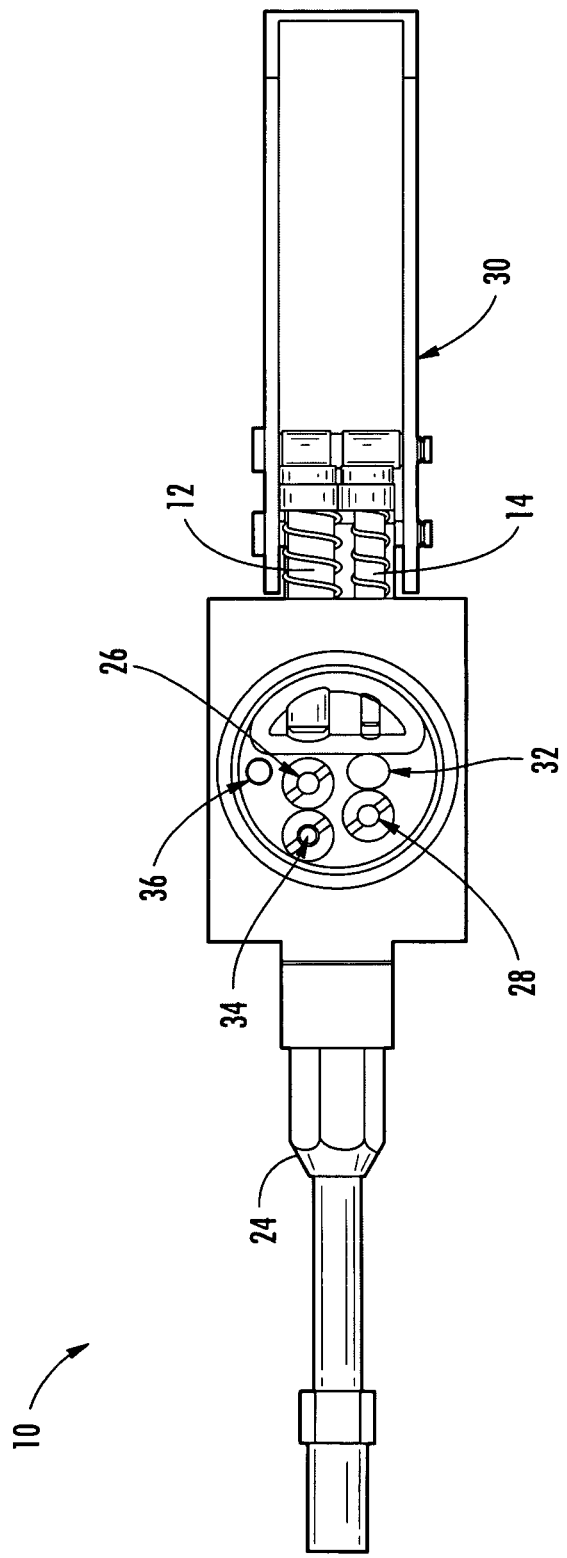
FIG. 1 is a bottom view with portions cut-away of a grease gun in accordance with one exemplary embodiment.
Figure 2:
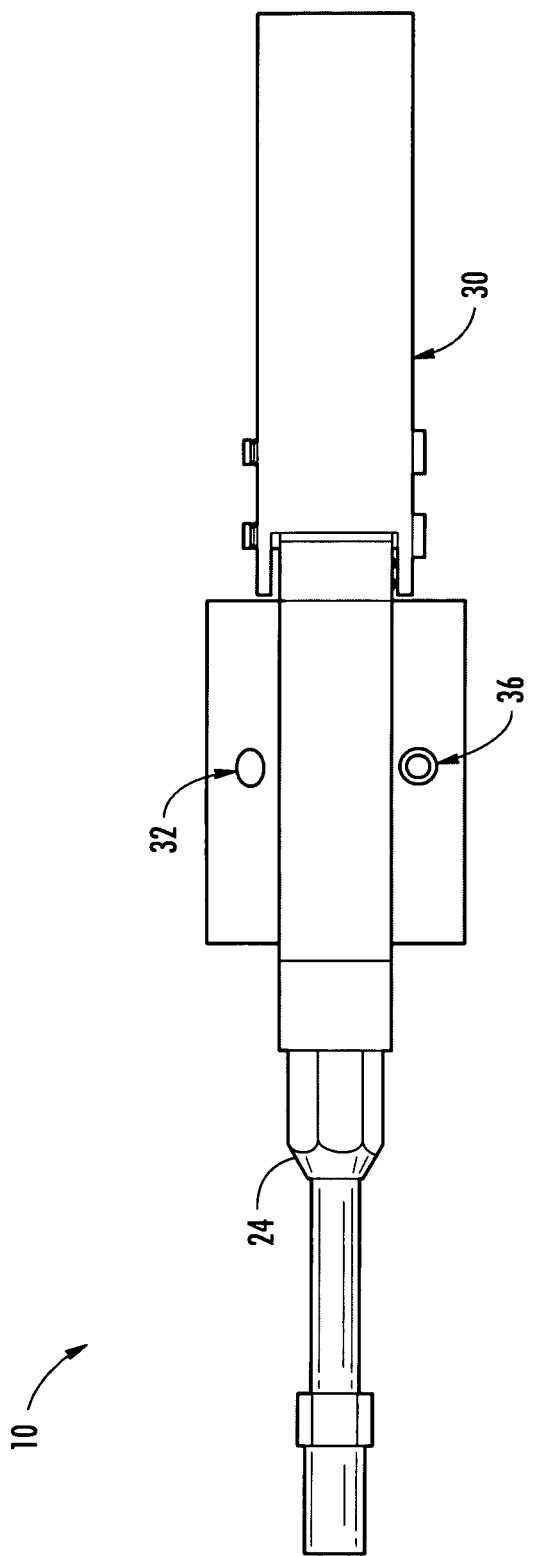
FIG. 2 is a top view of the grease gun of FIG. 1.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As seen in reference to FIGS. 1 through 5, a grease gun 10 having a dual piston is provided. A first intake valve 26 is a high volume/low pressure valve. A second intake valve 28 is a low volume/high pressure intake valve. Both valves 26 and 28 are operatively engaged with a pump handle 30 and are designed to interengage with a standard cartridge of grease (not shown) such that a pumping action withdraws the grease through the check valves 26 and 28 and into the chambers 16 and 18 for eventual dispensing to the grease pipe 24.

The user, when operating the grease gun 10, does not need to provide any type of switching or selection in order to have the grease gun 10 operate as intended. Under conditions where a high pressure delivery of grease is needed such as to overcome a clogged grease inlet, the pumping action of the handle 30 will be automatically directed to the high pressure/low volume piston 14 by operation of a pressure sensitive volume piston by-pass check valve 34. When the high pressure/low volume delivery is no longer needed, the selected check valve 34 will be used to select delivery of grease from the operation of the high volume/low pressure piston 12. In this manner, the operator of the grease gun 10 is provided the benefits of a seamless operation in which the grease gun 10 and the valving therein automatically directs the proper operation of the desired piston or pistons 12, 14. In instances where there is low pressure delivery, the high volume piston 12 is actuated to withdraw grease from the associated grease cartridge and deliver it through the grease gun 10 to the grease pipe/coupler 24. Should sufficient resistance to grease flow be encountered, the gun 10 automatically disengages the operation of the high volume/low pressure piston 12 by way of opening the check valve 34 so that grease in the chamber 16 flows through the check valve 34. Actuation of the pump handle 30 still causes both pistons 12 and 14 to move when in the high pressure mode. At such time as the backpressure again decreases below a threshold value, the volume piston bypass check valve 34 will again engage and redirect the flow of the grease via the action of the high volume/low pressure piston 12.

The apparatus as described above and as seen in the referenced drawings is an improvement over the prior art designs which make use of external power supplies or mechanical interlinkages which require the user to recognize and actuate the necessary configuration of the grease gun. The design and operation of grease guns, pistons, and various check valves are well known in the art as seen in reference to U.S. Pat. Nos. 5,884,818 and 4,077,494, both of which are incorporated herein by reference.

U.S. Pat. Nos. 7,249,695, 5,277,339, and U.S. Patent Publication 20050230430 further describe the operation of a grease gun having various arrangements to alter the delivery pressure of the grease gun. The above two referenced patents and one references U.S. patent publication are also incorporated herein by reference.

Figure 4:
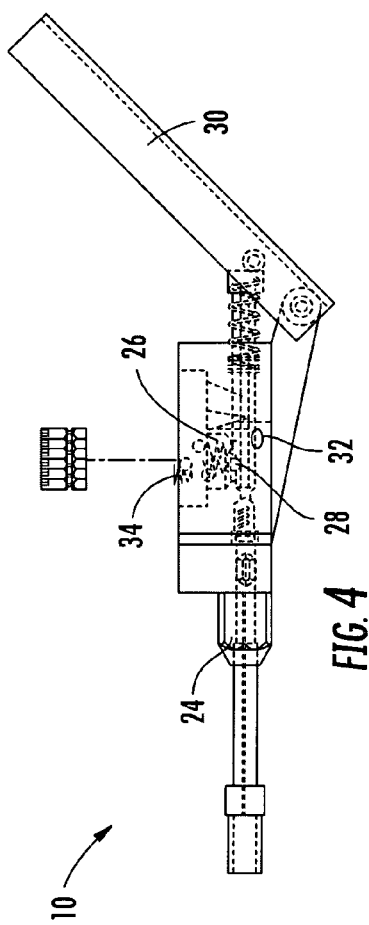
FIG. 4 is a side view of the grease gun of FIG. 1.
Figure 5:
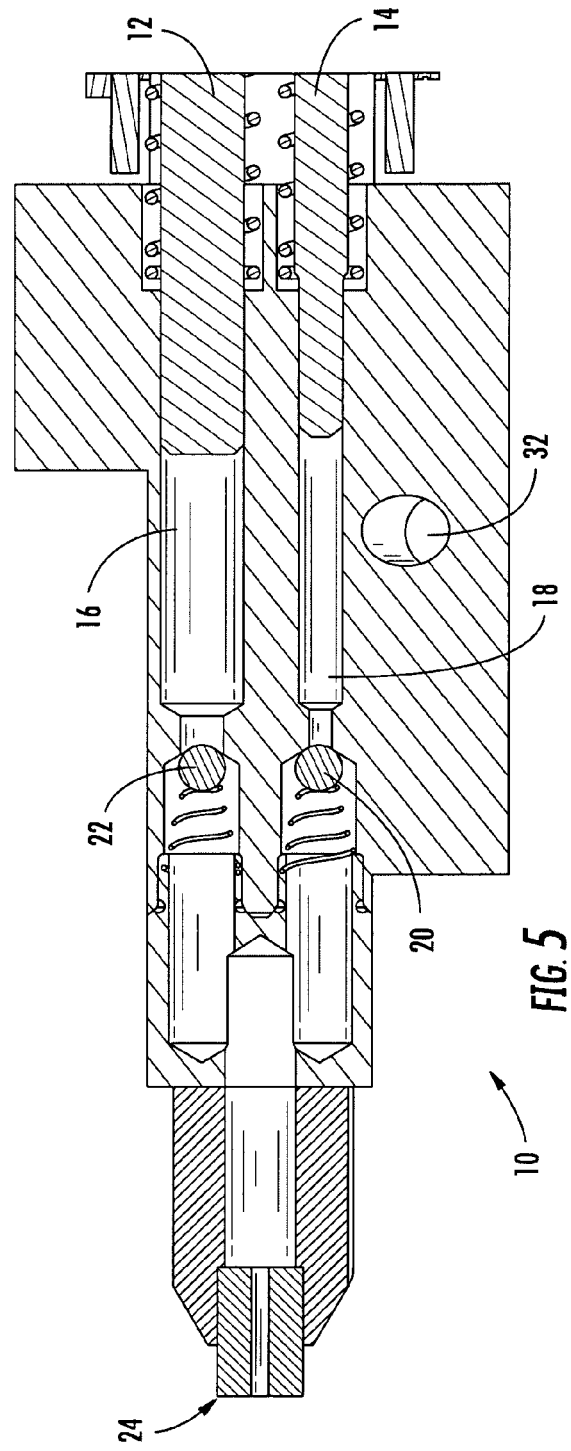
FIG. 5 is a cross-sectional view taken along line A-A of FIG. 4.

Referring to FIGS. 4 and 5, the grease gun 10 includes a first piston 12 that is a high volume/low pressure piston movable within a volume piston chamber 16. Grease present within the volume piston chamber 16 is forced therefrom by way of movement of the first piston 12 brought about by actuation of the handle 30. Movement of grease from the volume piston chamber 16 causes same to be dispensed past a volume piston back feed check valve 22 and into a grease pipe 24. In accordance with certain exemplary embodiments, the volume piston back feed check valve 22 is not present.

The grease gun 10 also includes a second piston 14 that may be a high pressure/low volume piston in accordance with one exemplary embodiment. Actuation of the handle 30 causes the second piston 14 to move in a linear manner through a high pressure piston chamber 18. The first and second pistons 12 and 14 may thus be both tied to the handle 30 such that movement of the handle 30 causes both of the pistons 12 and 14 to move in unison. The placement of grease within the high pressure piston chamber 18 and movement of the second piston 14 will cause the grease to be dispensed therefrom and past the high pressure piston back feed check valve 20 and through the grease pipe 24. In accordance with certain exemplary embodiments, the high pressure piston back feed check valve 20 is not present. The second piston 14 may have a smaller diameter than the first piston 12 so that grease dispensed by way of the second piston 14 is pushed under a higher pressure than that dispensed by way of the first piston 12. Further, the volume of the high pressure piston chamber 18 is less than the volume of the volume piston chamber 16 so that the volume of grease dispensed by way of the second piston 14 is less than the volume of grease dispensed by the first piston 12 per stroke of the handle 30. As illustrated with reference to FIG. 4, the pistons 12 and 14 may be attached to a portion of the handle 30 that pivots with respect to another portion of the handle 30 that is rigidly attached to the frame of the grease gun 10. If no backpressure is present, grease from both of the chambers 16 and 18 is dispensed into the grease pipe 24 upon actuation of the handle 30. In this regard, both pistons 12 and 14 move and cause grease in both of the chambers 16 and 18 to be dispensed simultaneously and collectively.

Figure 3:
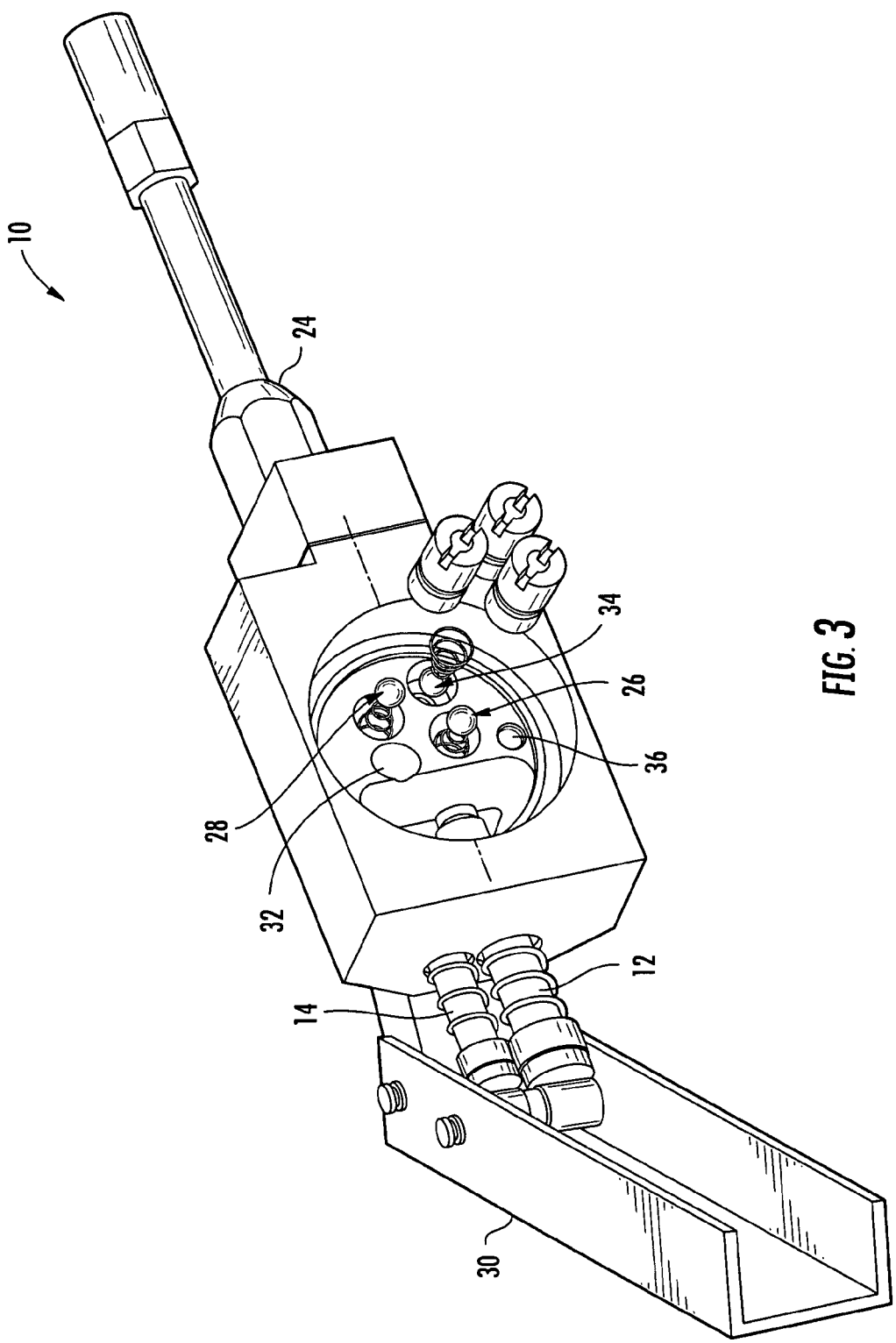
FIG. 3 is a perspective view of the grease gun of FIG. 1 with portions cut-away.

Referring now to FIGS. 1 and 3, the grease gun 10 includes a volume piston grease intake check valve 26 that opens and closes an opening into the volume piston chamber 16 through which grease may flow or be blocked. Also included is a high pressure piston grease intake check valve 28 that opens and closes an opening into the high pressure piston chamber 18 through which grease may flow or be blocked. In operation, the user may actuate the handle 30 so as to withdraw both of the pistons 12 and 14 to enlarge the size of the chambers 16 and 18. Doing so creates a negative pressure in the chambers 16 and 18 that functions to open up the volume piston grease intake check valve 26 and the high pressure piston grease intake check valve 28 to therefore allow grease to flow into the chambers 16 and 18. Reversal of the handle 30 results in reversal of the direction of movement of the pistons 12 and 14. This direction of movement causes an increase in pressure within the chambers 16 and 18. The pressure increase forces the check valves 26 and 28 to close the openings within the chambers 16 and 18 so that grease is prevented from flowing out of the openings. Grease will then be forced out of the ends of chambers 16 and 18 and to the machinery being serviced.

The grease gun 10 will operate in the aforementioned manner thus resulting in a high volume delivery of grease to the device. When a clog or other situation occurs that generates a backpressure in the system, the grease gun 10 may be arranged to shift into a high pressure mode from the high volume mode. In this regard, a volume piston by-pass check valve 34 is present and can be of a spring and ball type in one embodiment. Here, the spring and ball arrangement of check valve 34 may be opposite to that of both check valves 26 and 28. When a sufficient amount of backpressure is present, the volume piston by-pass check valve 34 is pushed down. This shift causes an opening to be present in the volume piston chamber 16 out of which grease may flow. Grease from the volume piston chamber 16 may flow past the open check valve 34 and back into the head of the grease gun 10. In effect, the check valve 34 opens to relieve pressure in the volume piston chamber 16. The check valve 34 thus opens automatically without any user intervention. The check valve 34 may be sized and selected to open at any desired backpressure. For example, 1500 psi may be required to be imparted via backpressure before the check valve 34 is actuated. Other exemplary embodiments are possible in which from 1500-2800 psi of backpressure is needed in order to actuation check valve 34. The check valve 34 or other component of the grease gun 10 may be adjustable in other exemplary embodiments to allow varying backpressures to be imparted to cause switching between the two modes as desired between different applications.

Continued movement of handle 30 when in the high pressure mode will again cause both pistons 12 and 14 to actuate. Drawing grease into the chambers 16 and 18 and then dispensing same will cause grease in the volume piston chamber 16 to flow through the open check valve 34 and back into the head of the grease gun 10. Other embodiments may be possible in which some amount of grease less than the full amount of grease in the volume piston chamber 16 is directed to the grease pipe 24 even when the check valve 34 is open. Grease in the high pressure piston chamber 18 will be forced to the grease pipe 24 and to the machinery being serviced as previously described. However, the volume of the resulting grease will be decreased and the pressure applied will be increased thus helping remove the clog or other situation causing the backpressure. Once the clog or other situation is removed, the backpressure in the system may be reduced to a level at which the volume piston by-pass check valve 34 again closes to thus allow grease in the volume piston chamber 16 to be directed into the grease pipe 24. The grease gun 10 will thus be returned to the high volume mode. Movement between the high volume and high pressure modes is thus dependent upon backpressure in the system and is automatically performed without user intervention. The user need not perform any user switching, that is turning a valve or selecting a lever or engaging a new connection or lever, to make the switch between modes of operation. As such, the user need not select a switch to cause the modes of operation to switch.

A grease bulk filler hole 32 is present through which grease may be transferred in the grease gun 10. Also shown is an air vent hole 36 that allows an air lock to be released so that grease in the tube may flow as desired.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

What is claimed:

1. A two stage grease gun, comprising:
   a handle capable of being actuated by a user;
   a volume piston chamber;
   a high pressure piston chamber that does not share a common longitudinal axis with the volume piston chamber, wherein the volume piston chamber has a greater volume than the high pressure piston chamber;
   a high volume/low pressure piston moved by the handle during actuation of the handle by the user, wherein the high volume/low pressure piston is arranged to deliver grease at a high volume and low pressure, wherein the high volume/low pressure piston is disposed in the volume piston chamber;
   a high pressure/low volume piston moved by the handle during actuation of the handle by the user, wherein the high pressure/low volume piston is arranged to deliver grease at a high pressure and low volume, wherein the high pressure/low volume piston is disposed in the high pressure piston chamber, and wherein the high volume/low pressure piston is free from engagement with the high pressure/low volume piston; and
   a by-pass check valve configured to actuate based upon a backpressure such that user actuation of the by-pass check valve is not needed, wherein the by-pass check valve effects the amount of grease dispensed by way of the high volume/low pressure piston such that when the backpressure is sufficiently high the by-pass check valve actuates to prevent grease from being dispensed by way of the high volume/low pressure piston and allows grease to be dispensed by way of the high pressure/low volume piston.

2. A method for delivering grease, comprising:
   providing a grease gun that has a volume piston chamber and a high pressure piston chamber that does not share a common longitudinal axis with the volume piston chamber, wherein the volume piston chamber has a greater volume than the high pressure piston chamber, wherein the grease gun has a high volume/low pressure piston disposed in the volume piston chamber, wherein the grease gun has a high pressure/low volume piston disposed in the high pressure piston chamber, and wherein the high volume/low pressure piston is free from engagement with the high pressure/low volume piston; and
   actuation of a handle that causes the high volume/low pressure piston to move and the high pressure/low volume piston to move, wherein grease is delivered in a high volume mode when backpressure is below a threshold and wherein grease is delivered in a high pressure mode when backpressure is above the threshold, such that in the high pressure mode grease is not delivered by the high volume/low pressure piston but is delivered by the high pressure/low volume piston.

* * * * *